April 14, 1959 — A. F. LEVIN ET AL — 2,882,188
METHOD OF RECLAIMING INSULATED WIRE
Filed Nov. 1, 1956

INVENTORS
ALLAN F. LEVIN
JEROME S. SZPILA
BY Paul Maleson
ATTORNEY

2,882,188

METHOD OF RECLAIMING INSULATED WIRE

Allan F. Levin and Jerome S. Szpila, Solebury Township, Pa.

Application November 1, 1956, Serial No. 619,660

11 Claims. (Cl. 134—9)

This invention relates to the art of reclaiming insulated copper. More particularly it relates to the stripping of plastic insulating coverings from solid or stranded copper wire whereby the copper may be reclaimed as very high grade copper scrap or may then be utilized as bare copper wire without further reclaiming. This invention further relates to the reclamation of insulating plastics which cover copper wire.

It is an object of this invention to provide a method whereby plastic covered wire may be separated into clean pure copper and clean pure plastic strips, each material being highly suited for reuse or reclamation.

It is a primary object of this invention to provide a mechanical stripping method to remove simple or compound plastic insulation from solid or stranded copper wire, the method being feasible and economical even with small diameter wire.

It is another object of this invention to provide a method of mechanical stripping of plastic from wire without burning or using cutting blades.

It is a still further object of this invention to provide a method of using coacting rolls so as to remove polyethylene, polyvinyl chloride or other plastic from wire.

A still further object of this invention is to mechanically remove insulation from wire without marring the wire.

It has heretofore been the practice to mechanically strip plastic insulation from wire by means of stationary or rotating knives or saw-like instruments of which there are many types. Such a stripping apparatus is disclosed for example, in U.S. Patent No. 2,761,211. It has been found as a matter of economic operation that when it is desired to strip wires of relatively small diameter, such as less than ½", for example, the plastic material should be burnt off the wire base. Greater operating difficulties are encountered with knives and saws when such small diameter wires are processed.

Among such difficulties is the problem of having the cutting instrument completely cut the plastic and yet not cut into the wire. If the cutting instrument cuts into the wire itself, chips, shavings or other wire material may get incorporated into the stripped plastic, thus lowering the reclamation value of the plastic. The presence of shavings in the plastic scrap is so deleterious that such scrap is often considered practically worthless. The difficulties of accurate dimensioning of the cut are, of course, further increased when wires of relatively small diameters are to be processed. Where the wire core is not always exactly centered in the plastic, as may happen when the original coating was extruded, the chances of cutting the wire core during knife stripping are obviously increased.

To avoid the aforementioned difficulties it has generally been deemed expedient, when processing small diameter insulated wire, to burn off the insulation. This results, of course, in the total loss of the plastic for reclamation purposes and also results in the production of "burnt copper." This burnt copper, which is partially oxidized due to the heat of burning and which may also contain traces of the burnt plastic material, is of substantially lower scrap value than clean copper.

Figure 1:
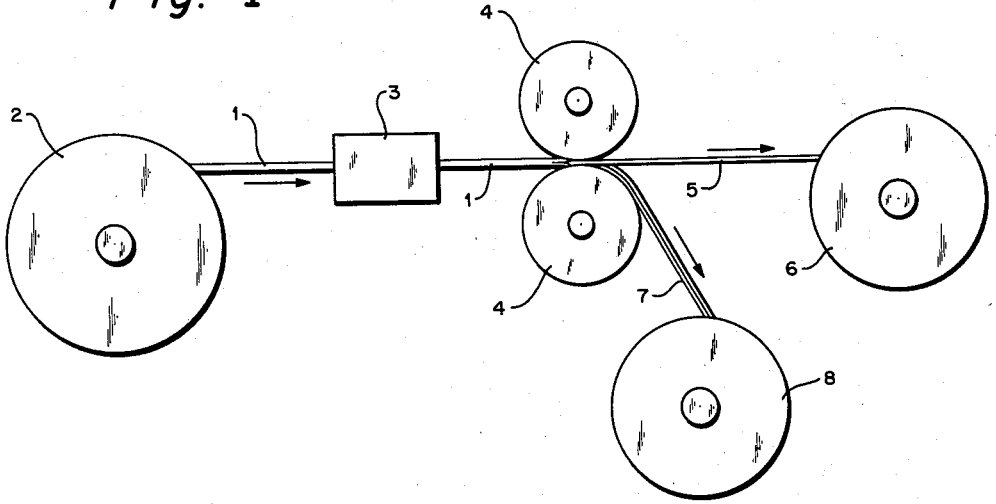
Figure 1 is a diagrammatic view of the wire stripping system.

The present invention provides a method of stripping thermoplastic insulating and protective material from wire without impairing the reclamation value of either the metal or the covering and being applicable even to small diameter wires. It has been found that this result may be obtained by the following simple but efficient process. The wire to be stripped is run between coacting rolls which rotate at different speeds, thus producing a "friction ratio." The two coacting rolls if spaced at or wider than the total outside diameter of the covered wire produce no effect. If the spacing between the rolls is between that of the diameter of the metal wire itself and the total outside diameter of the covered wire the best desired effect is obtained. This is the preferred range of gap. If the gap between the rolls is less than the diameter of the wire itself, the desired result may still be obtained but with progressively increasing deficiencies and lack of desirability as the gap is narrowed as will be explained hereafter.

As the insulated wire passes between the rolls the plastic covering comes off the wire core in two segments, each comprising about 180 degrees of arc around the core. It has been found that if the roll gap is relatively wide within the preferred operating range, the plastic material may separate off the wire core in only one segment. Since separating off in two segments makes for easier separation of the plastic and wire, the slightly narrower spacing of the rolls is considered better.

Variations in the plastic materials, operating temperatures or other conditions will vary the exact amount of gap closure required to produce two-segment separation as opposed to one-segment separation. The degree of gap closure within the preferred range needed to produce two-segment separation is thus difficult to accurately quantitatively determine in general terms. It may be easily determined by trial and error on each run by progressively closing the roll gap until the desired splitting into two segments begins.

One limiting factor in the preferred method is the production of heat because of friction. Excessive heat causes the thermoplastic materials to soften and smear. A certain amount of heat is generated during the operation of this process even with roll gap spacing in the preferred range. It has been found that operation of the process without cooling the rolls has resulted in the plastic becoming so sticky as to cause the wire to wrap around the rolls.

In addition to the required cooling to avoid excessive heat, the gap spacing should remain within the preferred limits to avoid additional heating difficulties. If the roll gap is less than the diameter of the wire core it has been found that the frictional heat produced by the excessive distortion of the plastic may become great enough to soften the plastic even when cooling is supplied. Even where the cooling is efficient enough to counteract this heat, another difficulty arises if the roll gap is less than the wire core diameter. The wire itself is deformed and flattened by the roll. It is understood, of course, that such narrow gapping still produces a useful result, but ordinarily it would be desirable to produce a copper that is still perfectly round, unmarred and unworked rather than a flattened copper strip.

If the temperature of operation were allowed to become so low that the plastic tended to become brittle, it would shatter and fragment during the process which, of course, would hinder its efficient handling. Under normal circumstances of course, such low temperatures would never be encountered. It is not possible to state an exact upper temperature limit above which the process would become unworkable but it is believed that at temperatures of about 100 degrees F. and above the undesirable plastic softening takes place. The permissible upper temperature will vary with the particular plastic involved. For example, copper wire coated with polyethylene inner covering and a PVC (polyvinyl chloride) outer covering was found to soften enough to cause the wire to wrap around the rolls at a temperature of about 260 degrees F. where the running speed was 30 feet per minute. This condition was attained when no cooling was supplied. It is preferable to operate the process as close to room temperature (65–70 degrees F.) as possible. The exact speed ratio or "friction ratio" between the two coacting rolls does not seem particularly critical. It has been found that ratios of about 1.2/1 have been highly successful. A ratio as high as 3/1 would result in tearing and shredding the plastic covering, thus making subsequent handling difficult and also would tend to raise the frictional heat produced.

The rolls used in the practice of this method may conveniently be those associated with well known milling machines or calendering machines. Plain cylindrical rolls with smooth surfaces are satisfactory. Such a machine that has drive provisions for driving the two rolls at different speeds is satisfactory. In addition, the rolls must have cooling means. Cooling means common in the art consist of internal channels in the rolls. Through these channels, heating or cooling fluids are circulated depending on the use to which these rolls are to be put. When used in the present process a cooling medium, conveniently water, is circulated through the channels. Water at ordinary tap temperature will be satisfactory in maintaining the roll temperature near the preferred operating temperature of about 65–70 degrees F., room temperature.

Some of the more common commercial insulated wires with which this process has been practiced are polyethylene coated copper wire, PVC-coated copper wire, and compound coated copper wire having an inner coating of polyethylene and outer coating of PVC.

An insulated copper wire having a metal core of about 66 mils in diameter, a 46 mil coating of polyethylene, and an outer coating of PVC about 22 mils thick, was stripped by the present process. A small mill having two coacting internally cooled rolls each of about five inches in diameter was set so that the roll gap was between about 66 mils and 134 mils. Water at tap temperature was circulated through the rolls. The friction ratio was about 1.2/1. The covered wire was fed from a reel through the rolls at about 30 feet per minute. The copper wire core came from the rolls perfectly round and unmarred. The plastic coating was split from its surface to the core at two diametrically opposed points around its circumference, and came from the rolls in 2 similar continuous segments. Various gap spacings were tried with results as described in preceding paragraphs.

Equally satisfactory results have been obtained with other thicknesses and types of coatings. Success has been obtained with multi-stranded wire. One such tested wire consisted of 7 copper strands totaling 102 mils in diameter covered with a PVC coating of 26 mils in thickness.

In a probable commercial usage, insulated wire would be taken off a reel or from some other type of container, given a superficial wiping or washing to remove surface dirt, and then run through the two coacting rolls which could be aligned vertically, horizontally or in any convenient manner. The stripped copper wire would then be run onto a reel with which would be associated any of the well known winding devices and apparatus, as for example a tension block or capstan and guides. The plastic strips would likewise be run from the coacting rolls to reels.

In Figure 1, my wire stripping method is diagrammatically illustrated. Insulated wire 1 is fed from reel 2 through wiper 3 to remove surface dirt and is then fed between coacting cool rolls 4 which have different peripheral speeds as described above. The stripped wire 5 is led to reel 6. The insulation 7, which has been stripped off each unit, is led on to reel 8.

Figure 2:
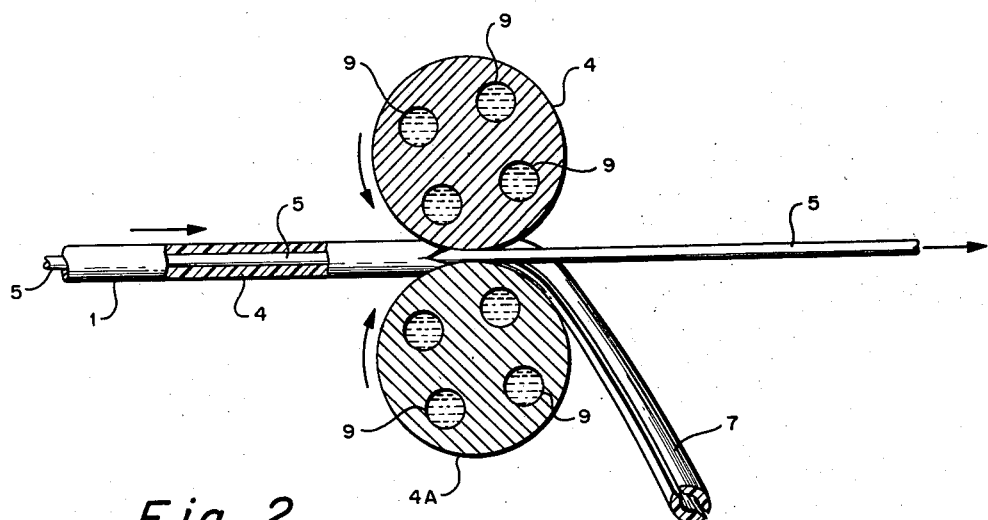
Figure 2 is a simplified elevational view, partly in cross-section, of the coacting stripping rolls.

In Figure 2, a more detailed view of the coacting cooled cylinders is shown. Insulated wire 1, comprising a metal core 5 and a plastic covering 7 is fed between coacting rolls 4 and 4A, rotating as shown. Each roll is cooled as by circulating water through channel 9. The rolls are spaced apart, preferably at least by the diameter of the core 5. The rolls 4 and 4A have different peripheral speeds as described above. The wire core 5 and the plastic insulation 7 are shown clearly separated after passing through the rolls.

If it is desired to give the plastic a preliminary chopping or comminution, the friction ratio may be increased to a point at which the plastic is shredded rather than produced in unbroken segments. However the production of unbroken strips is normally preferable.

It has been found that a plurality of wires may be simultaneously run through the rolls. Each wire is stripped as described above. Ordinary plain surfaced rolls are satisfactory.

In addition to the plastics named herein, other thermoplastic material used to cover wire may be similarly treated. As the covering wire enters the coacting rolls, the difference in drag exerted on the opposing sides of the covering due to the different speeds of the coacting rolls produces a stress which sheers the plastic from its surface to the wire core at two diametrically opposing points around the circumference. The core may be of metals other than copper, of course.

In addition to the advantages which have been discussed above, the ability to produce unmarred, unworked, and round cross-section copper wire may have decided commercial advantages since such wire may be usable without other reclamation steps. The products obtained from this process are in a highly pure state and extremely easy-to-handle form. The absence of oxides or other products of burning on the copper, and absence of any metal impurity in the plastic are very important in that the reclamation value of these materials is greatly increased.

Covered wire such as here described is often available for stripping because slight difficulties such as irregularity in the centering of the wire core in the plastic casing makes the wire unfit for its intended use. Such difficulties are frequently encountered in extrusion-coated wire, but they do not affect the operation of the present process.

The scope of this invention is to be determined by the appended claims and is not to be limited to the particular illustrations and embodiments herein disclosed.

We claim:

1. The method of stripping insulation from wire, comprising passing and insulated wire between coacting, rotating rolls having different peripheral speeds and having a gap between said rolls no greater than the outside diameter of the insulated wire, whereby the said insulation is cleanly stripped from the said wire.

2. The method of stripping plastic insulation from wire comprising passing said insulated wire between two coacting rolls having different peripheral speeds, providing a gap between said rolls no greater than the outside diameter of the insulated wire, and cooling said rolls, whereby the said plastic insulation is cleanly separated from the said wire.

3. The method as defined in claim 2 wherein the gap between the coacting rolls is at least as large as the diameter of the said wire whereby the wire produced by the method is unmarred, unworked and of round cross section.

4. The method as defined in claim 2 wherein the ratio of said different peripheral speeds is no greater than about 3/1/, whereby the said plastic insulation is stripped in a continuous segment.

5. The method of stripping plastic insulation from wire comprising passing said insulated wire between coacting rolls having different peripheral speeds in the ratio of about 1.2/1/ and having a gap between said rolls of at least the diameter of the said wire and no greater than the outside diameter of said insulated wire, maintaining the temperature of the insulated wire at the point of separation below the softening point of the said plastic insulation, whereby the said insulating wire is separated into clean plastic in a continuous segment, and clean wire.

6. The method as defined in claim 5 wherein the plastic insulation comprises polyethylene.

7. The method as defined in claim 5 wherein the plastic insulation comprises polyvinyl chloride.

8. The method as defined in claim 5 wherein the plastic insulation comprises an inner layer of polyethelene and an outer layer of polyvinyl chloride.

9. The method of stripping plastic insulation from wire comprising running said insulated wire from a holder, removing superficial dirt from the said plastic insulation, running said insulated wire through two coacting rolls having different peripheral speeds, maintaining the temperature at the point of stripping below the softening point of said plastic insulation, providing a gap between said coacting rolls no greater than the outside diameter of said insulated wire, and running the stripped said wire onto a holder and the stripped said plastic insulation in a continuous segment onto another holder.

10. The method as defined in claim 9 wherein a plurality of individual plastic insulated wires are simultaneously run through the same two coacting rolls.

11. The method of stripping plastic insulation from multi-stranded wire comprising passing said insulated multi-stranded wire between two smooth-surfaced coacting rolls having different peripheral speeds, providing a gap between said rolls no greater than the outside diameter of said insulated multi-stranded wire, maintaining the temperature at the point of stripping below the softening point of the said plastic, whereby said plastic insulation is cleanly separated from said wire.

References Cited in the file of this patent

UNITED STATES PATENTS 1,749,939      Heller  ----------------  Mar. 11, 1930